United States Patent [19]

Dundon et al.

[11] 3,821,480

[45] June 28, 1974

[54] MULTIPLEXER SYSTEM

[75] Inventors: Thomas M. Dundon, Wayland; Terence J. Hatton, Natick, both of Mass.

[73] Assignee: Datatrol, Inc., Hudson, Mass.

[22] Filed: May 29, 1973

[21] Appl. No.: 364,705

[52] U.S. Cl. .............. 179/15 A, 178/50, 179/2 CA, 340/152 R

[51] Int. Cl. .............................................. H04j 3/04

[58] Field of Search .......... 179/15 A, 15 AQ, 2 CA, 179/15 BA; 340/151, 152 R, 154, 172.5; 178/50

[56] References Cited

UNITED STATES PATENTS

| | | | |
|---|---|---|---|
| 3,379,836 | 4/1968 | Brightman | 179/15 A X |
| 3,575,557 | 4/1971 | McCowen | 178/50 X |
| 3,749,839 | 7/1973 | Fornasiero | 179/15 A X |

*Primary Examiner*—David L. Stewart
*Attorney, Agent, or Firm*—Joseph S. Iandiorio

[57] ABSTRACT

A multiplexer system for cyclically exchanging items of information with a plurality of terminals over bidirectional data lines, there being M terminals and each item of information having N parts, including scanner means for periodically scanning each of the M terminals in sequence and retrieving a one of the N parts from each terminal over a bidirectional data line during each period of a first portion of each cycle; input storage means having N storage areas each having M storage locations; first steering means for directing the M parts retrieved from each different scanning period to a different one of the N storage areas; and means for reading out one of the M parts from each of the N storage areas simultaneously to reconstruct each of the items of information transferred from each of the M terminals.

9 Claims, 5 Drawing Figures

MULTIPLEXER SYSTEM

FIELD OF INVENTION

This invention relates to a multiplexer system for exchanging items of information with remote terminals over bidirectional data lines, and more particularly to such a multiplexer system in which the items of information are transferred to and from each terminal a bit at a time.

BACKGROUND OF INVENTION

A synchronous control systems for transferring items of information between one or more remote terminals and a multiplexer unit or other device enable items to be sent by each terminal independently. This approach typically requires that the multiplexer unit or other receiving device operate in two modes: a first, very high speed scanning, mode to locate a terminal that needs servicing and a second mode in which a recognized terminal is serviced. This approach also requires that some preliminary storage device be provided for holding data until that terminal can be recognized and serviced. Alternatively, synchronous systems, wherein data is clocked to and from terminals, typically require two data lines for separately conducting data in the two directions, and a clock line for delivering timing signals to the terminal.

A single bidirectional data line eliminates the need for two separate data lines. But the use of a bidirectional data line requires that transfers to and from a terminal be done sequentially rather than simultaneously which considerably increases the transaction time for a terminal: when a full character or a number of characters are to be exchanged between a terminal and the multiplexing system the access time of any random terminal in a group of M terminals is substantial because the full character or number of characters must be transferred in each direction before the next terminal is serviced. Access time may be reduced by transferring only one bit at a time in each direction from each terminal in sequence. This requires that the information items, received in parts, or bits in association with specific terminals, must be reordered bringing together all the bits for a single character for transfer to a data processor or the like.

SUMMARY OF INVENTION

It is therefore an object of this invention to provide an improved multiplexer system for transferring items of information from remote terminals over bidirectional data lines.

It is a further object of this invention to provide such a multiplexer system for exchanging information a bit at a time with each terminal in sequence and exchanging information as a group of parts or bits or a character with a data processor.

It is a further object of this invention to provide such a multiplexer system for reordering bits received from each terminal to produce the character transmitted from that terminal and distributing the character or bits to the terminals.

This invention features a multiplexer system for cyclically exchanging items of information with a plurality of terminals over bidirectional data lines. There are M terminals and each item of information has N parts. Scanner means periodically scan each of the M terminals in sequence and retrieve a one of the N parts from each terminal over a bidirectional data line in each period of a first portion of each cycle. There are input storage means having N storage areas each having M storage locations. Steering means direct the M parts retrieved from each different scanning period to a corresponding storage location in a different one of the N storage areas. There are means for reading out one of the M parts from each of the N storage areas simultaneously to reconstruct each of the items of information transferred from each of the M terminals.

DISCLOSURE OF PREFERRED EMBODIMENT

Other objects, features and advantages will occur from the following description of a preferred embodiment and the accompanying drawings, in which.

Figure 1:
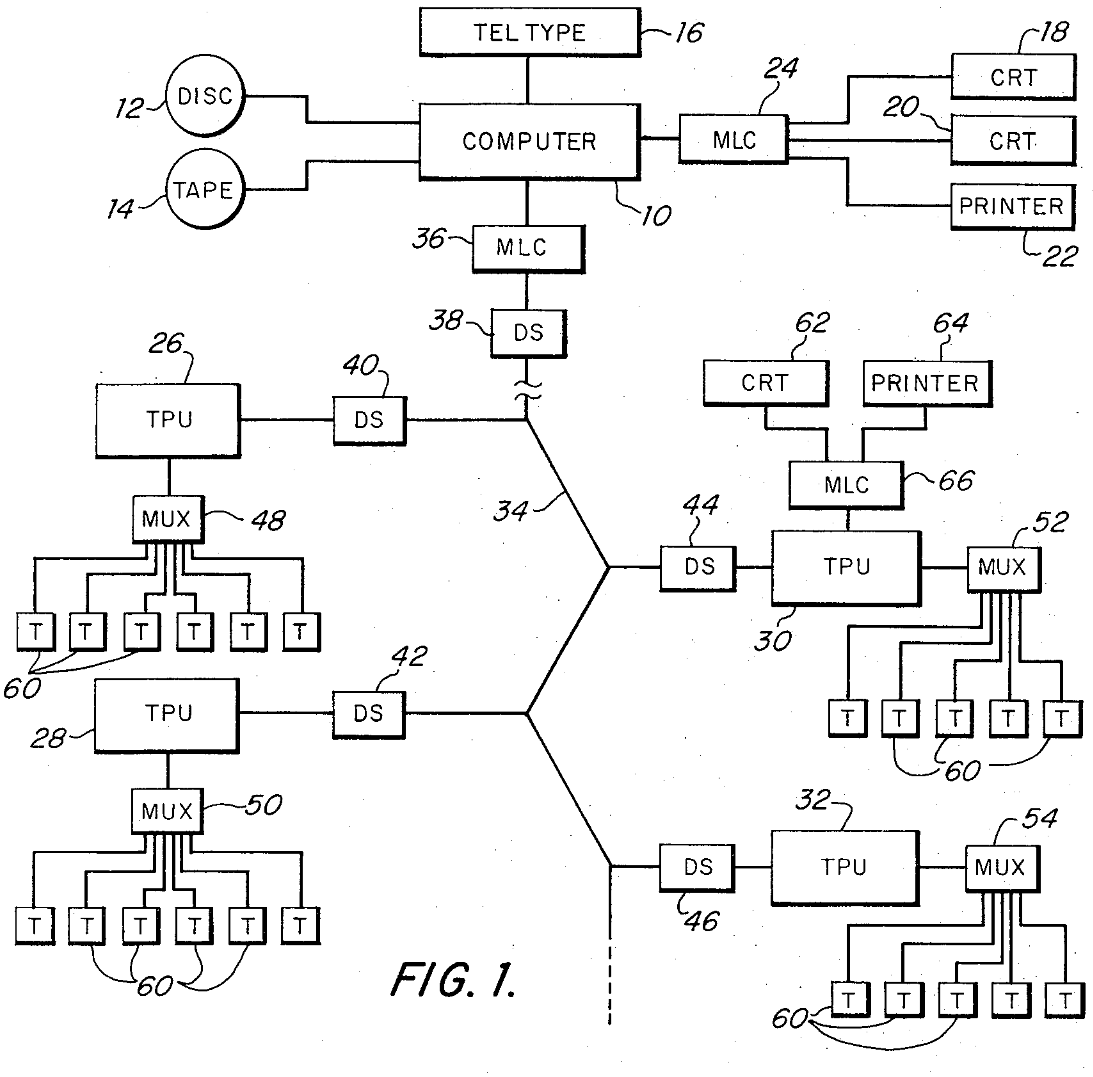
FIG. 1 is a schematic, block diagram of an automatic authorization system in which the control system interface of this invention may be utilized.

The invention may be used in an automatic authorization system such as a credit verification system as shown in FIG. 1, wherein a central computer 10 stores or retains a file on each customer charge account number. A request to computer 10 to check the credit of a particular customer account will cause the computer to call up the file corresponding to that customer account number, and perform a series of data manipulations which compares the present purchase to previous purchasing history with regard to dollar amounts per purchase, dollar amounts per day or week, the type of goods purchased, the frequency of the use of the card and other similar data which would indicate a run-up or other characteristic which may indicate that the card is being used by a credit card thief. Computer 10 typically has a number of peripheral devices such as disc unit 12 and tape unit 14 on which file data may be stored. In addition a teletype 16 may be directly connected to computer 10 and cathode ray tube display units 18 and 20 and a printer 22 may be connected to computer 10 through a multi-line controller 24 to permit the credit manager to be consulted under certain conditions pursuant to which computer 10 is instructed to print out on teletype 16 or printer 22 or display on CRT's 18 and 20 certain information from which the credit manager can make a decision. The decision is communicated to the computer by means of the teletype 16, printer 22 or keyboards which may be associated with the CRT displays 18 and 20 so that the computer can complete its data manipulation and respond to the inquiry which started the processing. Computer 10 typically may be located in the central office of a large chain store from which it communicates with programmable terminal processor units 26, 28, 30 and 32 over telephone lines 34 through a multiline controller 36 and data sets 38, 40, 42, 44 and 46 associated with multiline controller 36 and each of the terminal processor units 26, 28, 30 and 32. Each programmable terminal processor unit may have associated with it one or more multiplexer system 48, 50, 52 and 54 each of which may have associated with it a number of terminals 60. In each of the branch stores the programmable terminal processor unit, data set and multiplexer system would be located in or about the credit department while the terminals 60 would be provided one at each counter where there is a sales person. Each terminal 60 typically includes a keyboard for entering information into the system such as account number, dollar amount and the type of credit card such as the store's own card or Mastercharge, Bank Americard or the like and a display area. Each programmable terminal processor unit is also capable of having associated with it cathode ray tube displays, printers and various other peripheral devices as shown with relation to programmable terminal processor unit 30 which communicates with a cathode ray display device 62 and a printer 64 through a multiline controller 66.

Figure 3:
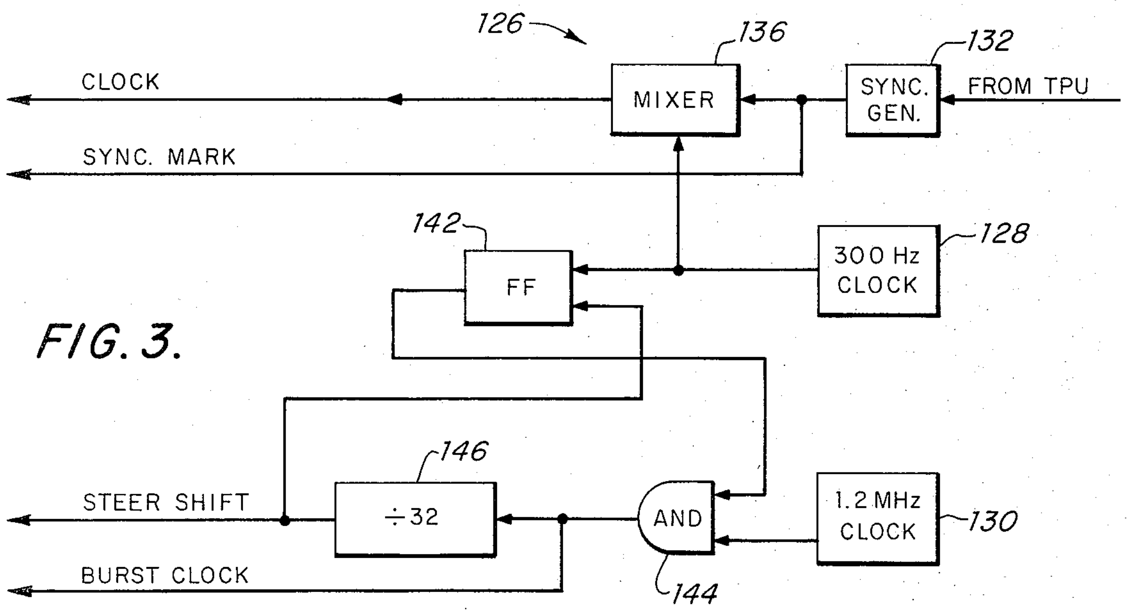
FIG. 3 is a detailed diagram of a clock circuit shown in FIG. 2.
Figure 2:
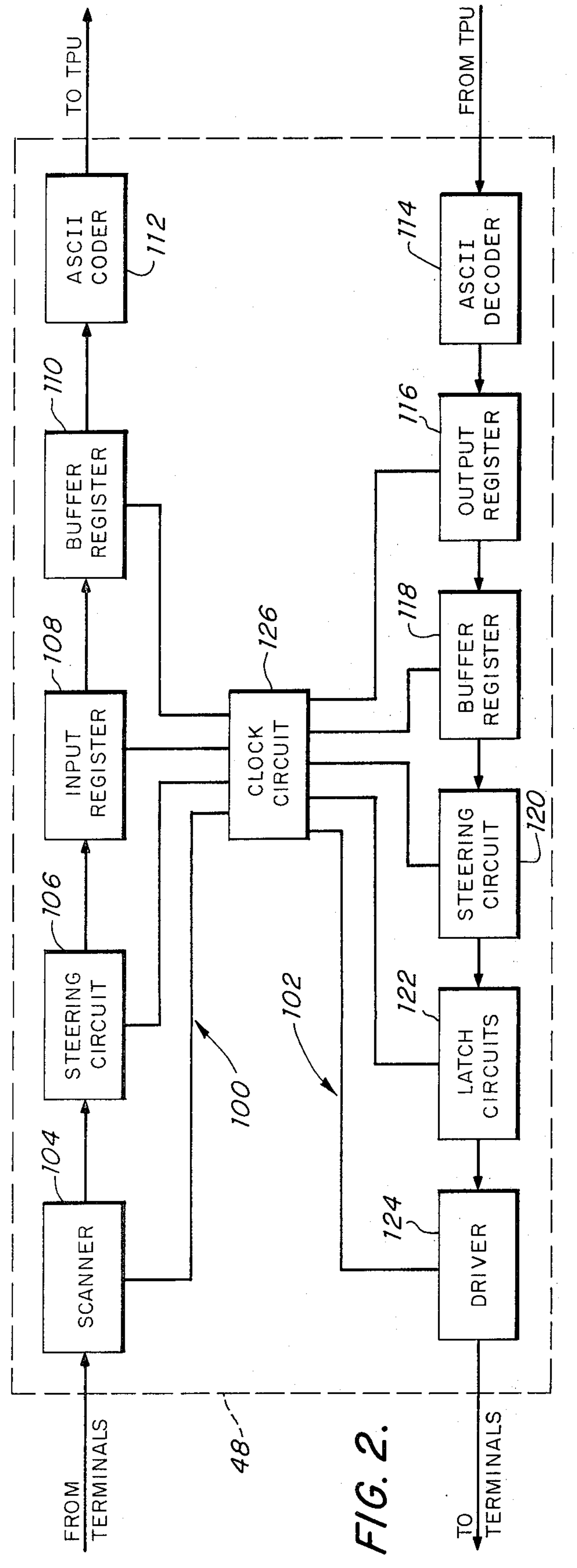
FIG. 2 is a block diagram of a multiplexer system according to this invention.

Each multiplexer system includes two channels: first channel 100, FIG. 2, which receives information from the terminals and delivers it to a data processor such as a terminal processor unit and second channel 102 which receives information from a terminal processor unit and delivers it to the terminals. First channel 100 includes a scanner 104 which scans a number, M, of terminals sequentially and delivers the information serially to steering circuit 106. There is an item of information present in each of the M terminals and scanner 104 takes only a part of that item from each of the terminals during each scanning period. Typically the item of information is a character made up of five bits and scanner 104 retrieves one bit at a time from each of the M terminals so that five complete scanning periods are required for all five bits of each character in each terminal to be received. Although the number of bits, N, as explained herein is five this is not a necessary limitation of the invention. Also for purposes of explanation the multiplexer system 48 will be referred to as servicing 32 terminals i.e., M is equal to 32 but this, too, is not a necessary limitation of the invention. As further described in connection with FIGS. 3, 4 and 5, a scanning cycle includes a synchronizing mark and ten transfer pulses. The transfer pulses are separated into two parts, an input portion $I_1$, $I_2$, $I_3$, $I_4$ and $I_5$ and an output portion $O_1$, $O_2$, $O_3$, $O_4$ and $O_5$. Each of these ten transfer pulses defines a scanning period.

Steering circuit 106 thus receives 32 bits during each scanning period which it directs to a particular storage area having 32 storage locations in input register 108. Input register 108 may be a portion of magnetic core storage or other type of storage or may be a group of registers. Preferably it contains N storage areas or registers each having thirty two storage locations. In this preferred embodiment where M is 32 and N is five there will thus be five separate storage locations or registers each having 32 stages. Thus steering circuit 106 introduces the 32 bits from the first scanning period into the first register, from the second scanning period into the second register, and so on ending with the 32 bits derived from the fifth scanning period being deposited in the fifth storage area. After all M storage locations in each of the N registers have been filled at the completion of N scanning periods the information in input register 108 is shifted to buffer register 110 so that input register 108 is once again free to receive information from scanner 104. Finally, the information in buffer register 110 is converted into ASCII code by ASCII coder 112 and transmitted to the terminal processor unit.

In second channel 102 information coming from the terminal processor unit is first converted from ASCII code to the five bit machine code by ASCII decoder 114 and then stored in output register 116. The transmission from the terminal processor unit is in the form of one five bit character at a time. Output register 116 typically can make use of N registers each having M storage locations. Thus the incoming five bit characters from decoder 114 are submitted one each of the five bits to one each of the five registers until thirty two five bit words have been thus entered into the output register 116. The bits are then shifted to buffer register 118 which permits output register 116 to immediately become available for more input from the terminal processor unit. Steering circuit 120 steers the thirty two bits from the first register to thirty two separate latch circuits 122 so that there is one bit stored in each of the thirty two latch circuits corresponding to each of the thirty two terminals. The contents of these latch circuits are then transmitted simultaneously over thirty two separate data lines to the thirty two terminals. The steering circuit 120 steers the contents of the second register to the latch circuits 122 and the operation continues in this manner until all registers have been emptied. The same data line is used to transmit data from each terminal to the scanner 104 and from driver 124 to each of the terminals so that each of the data lines to each of the terminals is a bidirectional data line which alternately transfers information back and forth between multiplexer system 48, and a particular terminal.

Figure 4:
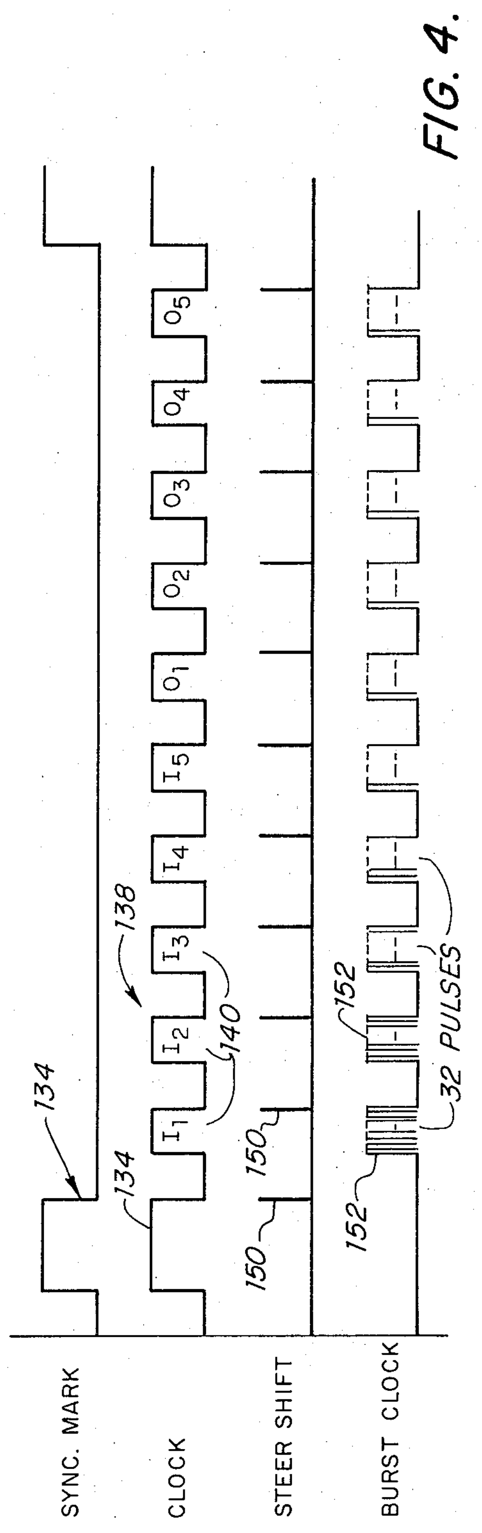
FIG. 4 is a chart of various timing signals produced by the clock circuit shown in FIG. 3.

Clock circuit 126 provides signals for operating various registers and circuits in channels 100 and 102. Clock circuit 126, FIG. 3, includes a 300 Hz clock 128 and a 1.2 Mhz clock 130. The various signals produced by clock circuit 126 are shown in the chart of FIG. 4. A signal from the terminal processor unit is used by synchronizing generator 132 to produce a synchronizing mark 134, FIG. 4, at the beginning of each scanning cycle. This synchronizing mark is combined in mixer 136 with the output of 300 Hz clock 128 to form the clock signal 138, FIG. 4, including a synchronizing mark 134 and ten transfer pulses 140. Clock signal 138 is formed in two parts: a first or input portion including a first group of five transfer pulses $I_1$ through $I_5$ which act to retrieve five bits of a character from the terminal, and a second or output portion including a second group of transfer pulses $O_1$ through $O_5$ which cause the transmission of five bits to a terminal. Upon each occurrence of a clock pulse from 300 Hz clock 128 flip-flop 142 is set and enables AND gate 144 to pass the 1.2 Mhz clock pulses from clock 130 which enables AND gate 144 to pass to the divide-by 32 circuit 146 the 1.2 Mhz clock pulses from clock 130. Upon receiving the 30 second clock pulse divide-by 32 circuit 146 produces a steer shift signal and resets flip-flop 142 disabling AND gate 144. Steer shift signal 150, FIG. 4, is a short pulse that occurs at the end of the synchronizing mark 134 and at the end of each of the transfer pulses 140. The burst of 32 pulses delivered through AND gate 144 to divide-by 32 circuit 146 is also used to provide a burst clock signal 152 which occurs during each transfer pulse 140 and which includes a burst of thirty two pulses at the rate of 1.2 Mhz. The burst of thirty two pulses occurs during each transfer pulse and defines a scanning period.

Figure 5:
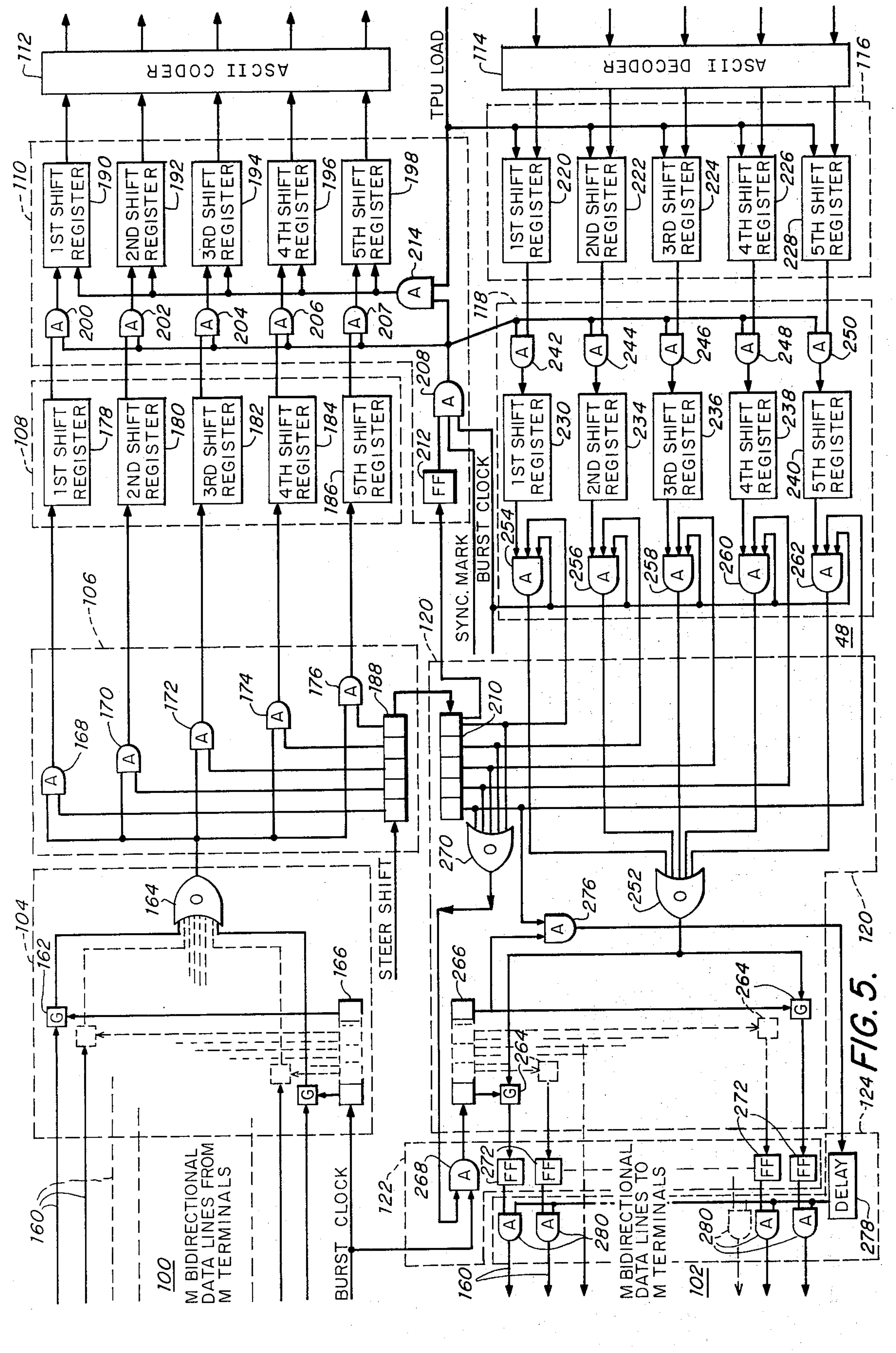
FIG. 5 is a more detailed schematic diagram of the multiplexer system of FIG. 2.

The response of the mutliplexer system of FIG. 2, to the timing signals shown in FIG. 4, is shown in more detail in FIG. 5. Each of the thirty two terminals is connected to scanner 104 by means of one of bidirectional data lines 160 each of which terminates in one of thirty two gates 162 at the inputs to thirty two input OR circuit 164. Gates 162 are gated on one at a time in sequence by shift register 166 as it is stepped thirty two times by the thirty two pulses of a burst clock signal 152. Thus a series of thirty two bits are present at the input of each of the AND gates 168, 170, 172, 174 and 176 associated with first register 178, second register 180, third register 182, fourth register 184 and fifth register 186, respectively. AND gates 168, 170, 172, 174 and 176 are enabled one at a time in sequence by outputs from register 188 stepped by steer shift pulses 150. Upon the first steer shift pulse following a synchronizing mark 134 AND gate 168 is enabled; on the next shift pulse AND gate 170 is enabled and so on until the last AND gate 176 is enabled upon the occurrence of the steer shift following the fourth transfer pulse $I_4$ in preparation for receiving the bits during the fifth transfer pulse $I_5$. In this manner five sets of 32 bits are stored one set in each of the five registers 178, 180, 182, 184, 186 in input register 108. The 32 bits stored in each of these registers are transferred a bit at a time, simultaneously, to corresponding first, second, third, fourth and fifth registers 190, 192, 194, 196 and 198 in buffer register 110 by means of AND gates 200, 202, 204, 206 and 207 upon the enabling of AND gate 208. Buffer registers 110 and 118 are not necessary but are used to provide full availability of data channels 100, 102. Three separate signals are required to enable AND gate 208; the first occurs when the sixth steer shift has reached five bit shift register 210 considered as a part of steering circuit 120 in channel 102. The sixth steer shift indicates that a complete read in operation consisting of N (five) scanning periods has been completed. This signal sets flip-flop 212 to provide one input to AND gate 208. The other two signals required by AND gate 208 are the synchronizing mark 134 and burst clock signal 152. Flip-flop 212 is set after all the information from a scanning operation is present in input registers 108. Then when a synchronizing mark next occurs a burst of 32 pulses will be transmitted by AND gate 208 to each of AND gates 200, 202, 204, 206 and 207 to gate the 32 bits in each of the shift registers in input register 108 to each of the corresponding registers in buffer registers 110. Simultaneously with this, and the occurrence of a load signal from a terminal processor unit, AND circuit 214 is enabled to shift the contents of each of the shift registers 190, 192, 194, 196 and 198 to coder 112 for delivery to the terminal processor unit.

Information delivered from the terminal processor unit to multiplexer 48 arrives at decoder 114 in channel 102. Decoder 114 converts the ASCII coded character into a five bit code and each of the five bits is placed in a different one of the first, second, third, fourth and fifth shift registers 220, 222, 224, 226 and 228 in output register 116. The five bit character code for each of thirty two characters is stepped into these registers in response to a load signal from the terminal processor unit which is synchronized with the signal delivered to the synchronizing generator 132, FIG. 3, which generates the synchronizing mark 134. The contents of registers 220, 222, 224, 226 and 228 are transferred to corresponding registers 230, 234, 236, 238 and 240 by means of AND gates 242, 244, 246, 248 and 250 enabled by a signal from AND gate 208. The entire contents (32 bits) of each of shift registers 230, 234, 236, 238 and 240 are steered to OR gate 252 in sequence by AND gates 254, 256, 258, 260 and 262, respectively, as they are enabled in sequence by a series of five signals from shift register 210 generated sequentially upon the occurrence of the next five steer shift signals 150. Simultaneously with the shifting out of the 32 bits in any particular register, 32 gates 264, are enabled in sequence one after the other by signals from shift register 266 as AND gate 268 passes the burst clock signal directly to shift register 266. AND gate 268 is enabled by a signal from OR gate 270 which produces a signal each time shift register 210 is stepped by a steer signal as AND gates 254, 256, 258, 260 and 262 are sequentially enabled to deliver the contents of their associated registers to OR gate 252. Having passed through gates 264 the thirty two bits, one bit from each of 32 different characters, destined for the 32 different terminals, are stored in flip-flops 272. Following the enabling of the last gate by shift register 266 in servicing the last register 240, AND gate 276 is enabled and produces a signal through a delay 278 to energize drivers 280 simultaneously to transfer the bit in each of flip-flops 272 over its corresponding bidirectional data line 160 to its associated terminal.

Other embodiments will occur to those skilled in the art and are within the following claims:

What is claimed is:

1. A multiplexer system for cyclically exchanging items of information with a plurality of terminals over bidirectional data lines, there being M terminals and each item of information having N parts, comprising:

scanner means for periodically scanning each of said M terminals in sequence and retrieving a one of said N parts from each said terminal over a bidirectional data line during each period of a first portion of each cycle;

input storage means having N storage areas each having M storage locations;

first steering means for directing the M parts retrieved during each different scanning period to a different one of said N storage areas; and means for reading out one of said M parts from each of said storage areas simultaneously to reconstruct each of the items of information transferred from each of said M terminals.

2. The multiplexer system of claim 1 further including:

output storage means having N storage areas each with M storage locations for storing M items of information each having N parts;

M latch circuits each one corresponding to a separate one of said M terminals for storing one of the M parts to be transferred to that terminal;

second steering means for directing each of the M parts stored in successive said storage areas to each of said M latches;

means for transferring said part stored in each of said latch circuits to its corresponding terminal over a bidirectional data line during each period of a second portion of each cycle.

3. The multiplexer system of claim 2 in which said scanner means includes first gating means associated with each of said terminals and means for activating each of said first gating means associated with each of said storage areas and means for operating each of said second gating means in succession.

4. The multiplexer system of claim 3 in which said first steering means includes second gating means associated with each of said storage areas and means for operating each of said second gating means in succession.

5. The multiplexer system of claim 4 in which said input storage means includes first and second storage means and third gating means for shifting said parts from said first to said second storage means, and said means for reading out includes fourth gating means and means for enabling each of said fourth gating means to simultaneously read out a said part from each of said N storage areas.

6. The multiplexer system of claim 2 in which said output storage means includes third and fourth storage means, and fifth gating means for shifting said parts from said first storage means to said second storage means.

7. The multiplexer system of claim 3 in which said steering means includes sixth gating means associated with each of said storage areas and means for operating each of said sixth gating means in succession.

8. A multiplexer system for cyclically exchanging items of information with a plurality of terminals over bidirectional data lines, there being M terminals and each item of information having N parts, comprising:

scanner means for periodically scanning each of said M terminals in sequence and retrieving a one of said N parts from each said terminal over a bidirectional data line during each period of a first portion of each cycle;

input storage means having N storage areas each having M storage locations;

first steering means for directing the M parts retrieved during each different scanning period to a different one of said N storage areas;

means for reading out one of said M parts from each of said N storage areas simultaneously to reconstruct each of the items of information transferred from each of said M terminals;

output storage means having N storage areas each with M storage locations for storing M items of information each having N parts;

M latch circuits, each one corresponding to a separate one of said M terminals for storing one of the N parts to be transferred to that terminal;

second steering means for directing each of the M parts stored in successive said storage areas to each of said M latches; and means for transferring said parts stored in each of said latch circuits to its corresponding terminal over a bidirectional data line during each period of a second portion of each cycle.

9. A multiplexer system for cyclically exchanging items of information with a plurality of terminals over bidirectional data lines, there being M terminals and each item of information having N parts, comprising:

output storage means having N storage areas each with M storage locations for storing M items of information each having N parts;

M latch circuits each one corresponding to a separate one of said M terminals for storing one of the N parts to be transferred to that terminal;

steering means for directing each of the N parts stored in successive said storage areas to each of said M latches; and means for transferring said parts stored in each of said latch circuits to its corresponding terminal over a bidirectional data line during each period of a second portion of each cycle.

* * * * *